United States Patent [19]

Bogdany

[11] Patent Number: 5,114,773
[45] Date of Patent: May 19, 1992

[54] RESILIENT COMPOSITE OPEN-CELL FOAM STRUCTURE AND METHOD OF MAKING SAME

[75] Inventor: John Bogdany, Ft. Oglethorpe, Ga.

[73] Assignee: Resilient Systems, Inc., Dalton, Ga.

[21] Appl. No.: 568,770

[22] Filed: Aug. 17, 1990

Related U.S. Application Data

[63] Continuation-in-part of Ser. No. 331,183, Mar. 31, 1989, Pat. No. 4,957,798, which is a continuation-in-part of Ser. No. 163,010, Mar. 2, 1988, abandoned.

[51] Int. Cl.$^5$ .............................................. B32B 3/26
[52] U.S. Cl. ....................................... 428/95; 427/244; 428/304.4; 428/317.1; 428/320.2; 428/322.7; 521/54; 521/170
[58] Field of Search .................... 427/244; 331/54, 170

[56] References Cited

U.S. PATENT DOCUMENTS

| | | | |
|---|---|---|---|
| 3,061,460 | 10/1962 | Schickedanz | 521/170 |
| 3,325,338 | 6/1967 | Geen | 428/290 |
| 3,489,594 | 1/1970 | Turkewitsch | 428/322.7 |
| 3,503,822 | 3/1970 | Turkewitsch | 428/322.7 |
| 3,622,435 | 11/1971 | Cacella | 428/320.2 |
| 3,661,674 | 5/1972 | Higgs et al. | 428/304.4 |

FOREIGN PATENT DOCUMENTS

| | | | |
|---|---|---|---|
| 1919804 | 9/1970 | Fed. Rep. of Germany | 428/310.5 |
| 1230378 | 4/1971 | United Kingdom | 428/310.5 |

*Primary Examiner*—William J. Van Balen
*Attorney, Agent, or Firm*—Kerkam, Stowell, Kondracki & Clarke

[57] ABSTRACT

A carpet underlay cushion structure is provided having a carrier layer of open-cell resilient foam material having an initial thickness, said resilient foam material being substantially completely and uniformly impregnated with an impregnant composition containing a polymer which is cured after said impregnation, wherein the open cells of said carpet underlay cushion structure partially comprise said foam material of said carrier layer, and wherein said cured polymer impregnant retains said carpet underlay cushion structure comprising said carrier layer and said cured polymer impregnant at a finished thickness less than said initial thickness of said carrier layer, and wherein the carpet underlay cushion structure possesses substantially the mechanical and physical properties of the polymer impregnant and wherein said carpet underlay cushion structure retains an open cell configuration at said finished thickness.

22 Claims, 4 Drawing Sheets

RESILIENT COMPOSITE OPEN-CELL FOAM STRUCTURE AND METHOD OF MAKING SAME

CROSS-REFERENCE TO RELATED APPLICATIONS

This application is a continuation-in-part of U.S. Patent Application Ser. No. 331,183 filed Mar. 31, 1989, now U.S. Pat. No. 4,957,798 which is a continuation-in-part of U.S. Pat. Application Ser. No. 163,010, filed Mar. 2, 1988, now abandoned.

BACKGROUND OF THE INVENTION

1. Field of the Invention

The present invention relates to open-cell resilient foam materials, and particularly to resilient foam materials for use as a carpet cushion underlay.

2. Prior Art

One of the outstanding advances in the plastics industry has been the development of polyurethane foams which are cellular plastic materials generally formed by the reaction of long chain polyol compounds and organic polyisocyanates. Cellular plastics are available in various degrees of rigidity, ranging from soft, flexible foams useful in cushioning, clothing interliners, rug underlays, sponges and bath mats; semi-rigid foams, useful particularly as crash pads; and rigid foams for structural and insulation purposes. The final properties of the urethane foams depend principally on the choice of polyethers, polyesters or other long chain polyhydroxyl compounds which are converted by the polyisocyanate into a high molecular weight polymer which is then foamed by a suitable foaming system, usually a reaction of water with the free isocyanate content of the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl materials favoring the production of a closed cell structure and the higher equivalent weight polyhydroxyl materials leading to the open-cell structure. The degree of branching of the polyhydroxyl reactant also influences the cell character.

The flexible and semi-rigid foams are processed for the aforementioned applications in a manner such that the foam has a low density, usually from about 1.25 to 4 pounds per cubic foot, and preferably as low a density as is consistent with the provisions of a product of adequate strength, etc. Moreover, such flexible and semi-rigid foams should have an open-celled structure for most applications, which is to say that essentially all (i.e., at least about 90 per cent), of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher, and usually have a closed cell structure.

For certain applications, including padding utilized under carpet, however, it is often desired to utilize materials other than polyurethanes. Unfortunately, however, other polymer systems do not lend themselves readily to being formed into open-cell, resilient structures. Generally, such structures are formed from latexes containing the desired polymer. The two most widely used procedures are the so-called Dunlap and Taladay foaming methods.

The Dunlap process utilizes a mechanical "foaming machine", e.g., the "Oakes" foamer or "Firestone" foamer whereby air is whipped into an aqueous latex compound (either SBR and/or natural latex). Once frothed, a "gelling" agent (sodium silicon fluoride, potassium silicon fluoride and/or ammonium acetate) is introduced to cause the latex system to coagulate and assume a semi-solid (putty-like) consistency which can then be subjected to heat and allowed to cure in order to hold a desired shape. The Dunlap process will not produce a thick foam structure on a continuous basis. It is generally used to produce molded pieces of various thicknesses.

The Taladay method is much like the "Dunlap Process" except that, instead of using a chemical gelation, it freezes the foam by introducing carbon dioxide gas into the system to cause coagulation of the latex. Once coagulated, the normal curing takes place.

It is almost impossible, however, to produce large or continuous foamed materials by these methods of a thickness greater than about ⅜ inch due to the fact that at the greater thicknesses, the foam cells collapse, causing uneven gauge and inferior physical properties.

The qualities of available polymers, however, such as the compression resistance and flexibility of the synthetic and natural rubbers, the fire-retardant properties of polyvinyl chloride, etc., make these systems very desirable for specific applications, e.g., padding materials, especially carpet padding or cushion underlay.

Several prior patents disclose polyurethane foam materials being impregnated with various compositions in order to obtain changes in particular characteristics of the polyurethane foam, however, none of these patents, discussed briefly below, provides an impregnated polyurethane foam structure having improved properties which are particularly useful as an improved padding material or as a cushion underlay material for use under carpet.

U.S. Pat. No. 4,008,350, issued to Crawford et al, discloses an open-celled polyurethane foam impregnated with acrylic latices. The use described for this product is for a lining or padding material for use between the foot or leg and a ski boot. As indicated in the specification of that patent, the resinous acrylic latices retard the response of the foam to compressive stresses, and slow the tendency of the foam to recover to its original dimensions. As such, the product is not well suited for use as a padding in certain uses, such as a carpet cushion underlay.

U.S. Pat. No. 4,169,184, issued to Pufahl, discloses a pressure sensitive adhesive structure. The polyurethane foam disclosed therein is to some extent (approximately 40%) open-celled, but it is a high density polyurethane, ranging from between 20-60 lbs./ft.$^3$. The end product is made from this high density base foam having a thickness in the range of 15-35 mils, and is impregnated with a polychloroprene (neoprene) latex. Such a product would not yield a useful material for a padding such as a carpet cushion underlay material.

U.S. Pat. No. 4,279,953, issued to Barden et al, discloses a heat resistant product for use between an automobile floorboard and the floor carpeting in the automobile. This product is not intended to be used as a cushion or padding, nor would it perform particularly well in such service. This patent teaches the use of carboxylated styrene-butadiene rubber (SBR) as an impregnating material, and only the outer surface portions of a polyurethane foam are impregnated. Carboxylated SBR imparts little or no resiliency to the final product, and the less than complete impregnation of the polyurethane foam provides no substantial improvement in resiliency of the foam.

U.S. Pat. No. 4,288,559, issued to Illger et al discloses the use of a foam material, preferably a polyurethane foam, impregnated with a dispersion of aluminum hydroxide, polyurethane latex and mixing stabilizers. The end product in this patent is touted as providing a foam material having increased flame resistance without impairment of the mechanical properties of the foam. As indicated previously, polyurethane foam has shortcomings in several respects for use as a padding material and especially as a carpet cushion underlay.

U.S. Pat. Nos. 4,547,526 and 4,455,396, issued to Al-Tabaqchali et al disclose a polyurethane foam impregnated with an aqueous dispersion of an acrylate and a flame protection agent which includes an aluminum trihydrate. Like the Illeger et al patent discussed above, the products disclosed are directed to providing increased resistance to flame without impairment of the original mechanical properties of the foam. The use of an acrylate in the impregnant is indicated as providing better resistance to aging than a polychloroprene latex would provide.

U.S. Pat. No. 4,239,571, issued to Cobb, is directed to a polyurethane foam which is impregnated with a liquid thermosetting resin which is cured while the foam is in compression. The resulting composite multilayered structure is not open-celled and is not sufficiently resilient for use as a padding material such as a carpet cushion underlay. U.S. Pat. No. 4,157,416, also issued to Cobb, is directed to a similar process and product wherein a urethane foam is employed to hold two different resin systems while they are cured to a rigid phase.

U.S. Pat. No. 4,224,374, issued to Priest, discloses a polyurethane foam substrate impregnated with a carboxylated neoprene latex mixture having alumina trihydrate included for increased fire resistance. Like the products disclosed in the Illger et al and Al-Tabaqchali et al patents, the object of impregnating the foam is to impart fire or flame resistance to the foam without affecting or impairing the mechanical properties of the substrate.

U.S. Pat. No. 4,260,688, issued to Simon, discloses yet another approach to flame-proofing a polyurethane foam without disturbing the physical properties of the foamed plastic. This patent discloses an impregnant including a carboxylated vinylidene-butadiene copolymer and aqueous ammoniacal combinations of benzenephosphonic acid and melamine salts.

U.S. Pat. No. 4,042,746, issued to Hofer, discloses a multilayered composite structure having a rigid foam core member. One or more open-celled, initially resilient polyurethane foam layers are impregnated with a thermosetting or polymerizable liquid resin which is cured under compression with the rigid foam core at the center and a reinforcing fiberglass layer laminated at an outer surface. The resulting structure is not resilient, and in that respect it could not be used as a padding or cushion material for carpet.

Several U.S. patents disclose processes in which a foam material is compressed at some point during the processing of the foam material into a final product. U.S. Pat. No. 3,867,211, issued to Chant, involves a process whereby an open-cell foam sheet has a fibrous layer applied to at least one side of the sheet, the fibrous layer and sheet are compressed to allow a thermosetting resin to impregnate the layer and sheet, and prior to the curing of the resin in the foam sheet, the compression of the sheet is reduced to permit the foam sheet to expand.

U S. Pat. Nos. 3,193,437 and 3,193,441, both issued to Schafer, disclose urethane foams impregnated with polyester resins which are compressed and cured to form leather-like, non-porous surfaces wherein the thermosetting resin substantially completely fills the open cells of the polyurethane foam. The product is disclosed as being suitable as a substitute for leather in many utilizations, and therefore does not appear to have any substantial amount of resiliency which is required for a padding material.

The systems and methods described in the above-identified patents are found lacking in disclosing an improved padding material having an impregnated foam structure especially advantageously used as a carpet cushion underlay. Further, none of the prior art systems disclose the impregnation of a foamed material with a solution containing greater than 80% solids, and up to 88% solids. The preferred ranges in these patents go up to only about 60-65% solids, and only the Illger et al patent discusses the possibility of using a solution having up to 80% solids. Further, none of the patents noted above disclose a method for producing a resilient padding material in which the density and resiliency of the end product are controlled by compressing the foam carrier while the impregnant sets or is cured.

It is therefore a principal object of the present invention to provide an improved padding material or carpet cushion underlay having improved mechanical properties over unimpregnated low-density polyurethane foams and other latex impregnated polyurethane foams.

It is a further object of the present invention to provide an improved padding structure having an open-celled polyurethane foam carrier impregnated with an aqueous or non-aqueous thermosetting or thermoplastic material which is set or cured while the foam carrier is maintained under compression, the structure further optionally having a substrate or scrim bonded thereto by adhesive or by the dried impregnant.

It is a further object of the present invention to provide a method for forming a padding material including impregnating a foam carrier with an aqueous or non-aqueous thermosetting resin or thermoplastic material, compressing the foam carrier by a predetermined amount, and curing the thermosetting or thermoplastic material while the foam carrier is being held in compression.

SUMMARY OF THE INVENTION

The above and other objects of the present invention are realized by providing a padding structure especially suitable for use as a carpet cushion underlay comprising a layer of open-cell, resilient polyurethane foam material substantially uniformly impregnated with a fluid composition containing a polymer which has been dried and/or cured after impregnation, while the polyurethane foam material is under compression, to produce a foamed substantially open-cell, resilient structure formed primarily of the polymer wherein the open cells thereof partially comprise the foam material. The composite structure further optionally comprises a substrate laminated to the impregnated foam, the substrate preferably being a scrim of the type customarily used as a primary backing for the yarn of a tufted carpet.

The present invention also provides a method of making a composite structure comprising substantially uniformly impregnating, with a reverse roll application, for example, a layer of open-cell, resilient foam material with an aqueous or non-aqueous thermosetting or thermoplastic composition, and before the composition is dried or cured, compressing the foam material to a predetermined percentage of its original thickness and drying or curing the composition to produce a foamed, substantially open-cell, resilient structure of a thickness less than the original thickness of the foam carrier.

The method permits the material properties to be varied, for example, the density of the padding material which is the end product of the method may be increased without increasing the overall weight of the padding material by compressing the foam to a greater extent. The method thus provides wide flexibility in producing padding for various applications.

DETAILED DESCRIPTION OF THE INVENTION

Figure 1:
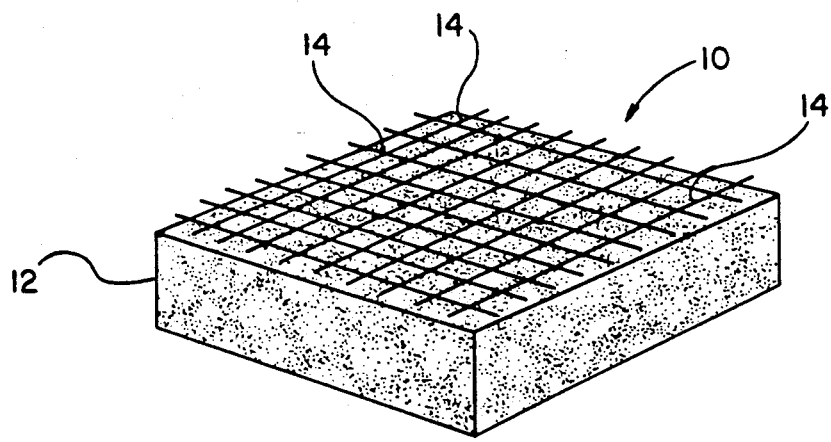
FIG. 1 is an elevational view of a carpet cushion structure of the invention.

Referring initially to FIG. 1, a composite carpet padding structure according to the present invention is indicated generally as numeral 10. Carpet padding structure 10 preferably comprises a carrier layer or base foam material 12 which is a conventional, low-density, open-celled, resilient foamed polyurethane (either polyester or polyether), and most preferably the foam has a density of less than about 1.5 lb./cu.ft.

The base foam material 12 is impregnated with a fluid composition containing a desired polymer, preferably by using a reverse roll applicator, in a method which will be discussed in more detail later in the specification. Preferably the fluid composition employed is a latex (i.e., water emulsion), in order that a substantially complete impregnation or distribution throughout the foamed material may be achieved.

The fluid composition comprises a polymeric material compatible with the base foam material and which is capable of suspension in a fluid for impregnation of the open cells of the foam material. It will be understood by those skilled in the art that the particular polymer selected will depend upon the properties desired in the final composite structure and application to which it is to be put. Illustrative but not limitative of such polymers are synthetic rubbers such as the styrene-butadiene copolymers, acrylonitrile-butadiene-styrene terpolymers, etc.; natural rubbers; acrylic and methacrylic polymer and polymers; polyvinyl chloride or combination of these polymers.

In addition, suitable conventional fillers (e.g., mineral fillers, calcium carbonates, alumina hydrate, barytes, limestone, talc, etc.), coloring agents, curing agents, or other adjuvants may be incorporated in the fluid polymer composition prior to impregnation.

It has been determined in accordance with a first embodiment of the present invention, directed primarily to a carpet cushion underlay or padding, that the preferred thermoplastic polymers for use in the latex are styrenebutadiene rubber (SBR) in cold or non-carboxylated form, natural rubber, or a combination of the two. The term "cold SBR", which is commonly used and well known in the art, refers to a styrene-butadiene copolymer which is cross-linked or cured with sulfur. When used to impregnate a low density, open-celled polyurethane foam, the above-identified preferred thermoplastic polymers yield a cushion or padding end product, especially well-suited for use as a carpet padding, having substantially improved physical properties, including compression resistance, resilience and resistance to shear force or tearing. Instead of retaining the mechanical properties of the base foam, as appears to be the result in most of the prior art impregnated foam systems, the mechanical properties of the impregnated foam according to the preferred embodiment more closely approximate those of a foamed product made of the polymer contained in the latex. Thus, the foam base material 12 may be considered a "carrier" for the polymer latex, providing a matrix around which the latex may be dried into final form.

The composite carpet cushion structure 10 also preferably has at least one substrate layer 14 laminated thereto in the manufacturing process. Substrate 14 may be made of one of several types of suitable material, and is preferably a woven scrim of the type conventionally used as a primary backing for tufted carpet. One suitable substrate is manufactured by Amoco, and sold under the registered trademark "Action-Bac". Other woven, non-woven or porous sheet materials may also be suitable for use as the substrate, examples of which include acrylics, polypropylene, nylon, cellulose, jute, or woven or non-woven fiberglass, having a density of approximately one half to 4 ounces per square yard. The substrate 14 serves to further improve the mechanical properties of the impregnated foam structure, providing increased dimensional stability, improved distribution of compressive forces over a wider area, and further improves resistance to tearing of the padding material. The latter of these is especially important in carpet padding which is to be secured to a flooring surface with adhesive. The improved resistance to tearing evidenced in the padding of the present invention facilitates the complete removal of such padding (e.g., for replacement) with reduced chances that the padding will tear at the locations where the padding has been adhered to the flooring surface. Substrates may be used on both the upper and lower surfaces of the carpet cushion structure 10, to provide a lower surface for bonding to the flooring and an upper surface facilitating the ability of the carpet to slide across the surface.

Figure 2:
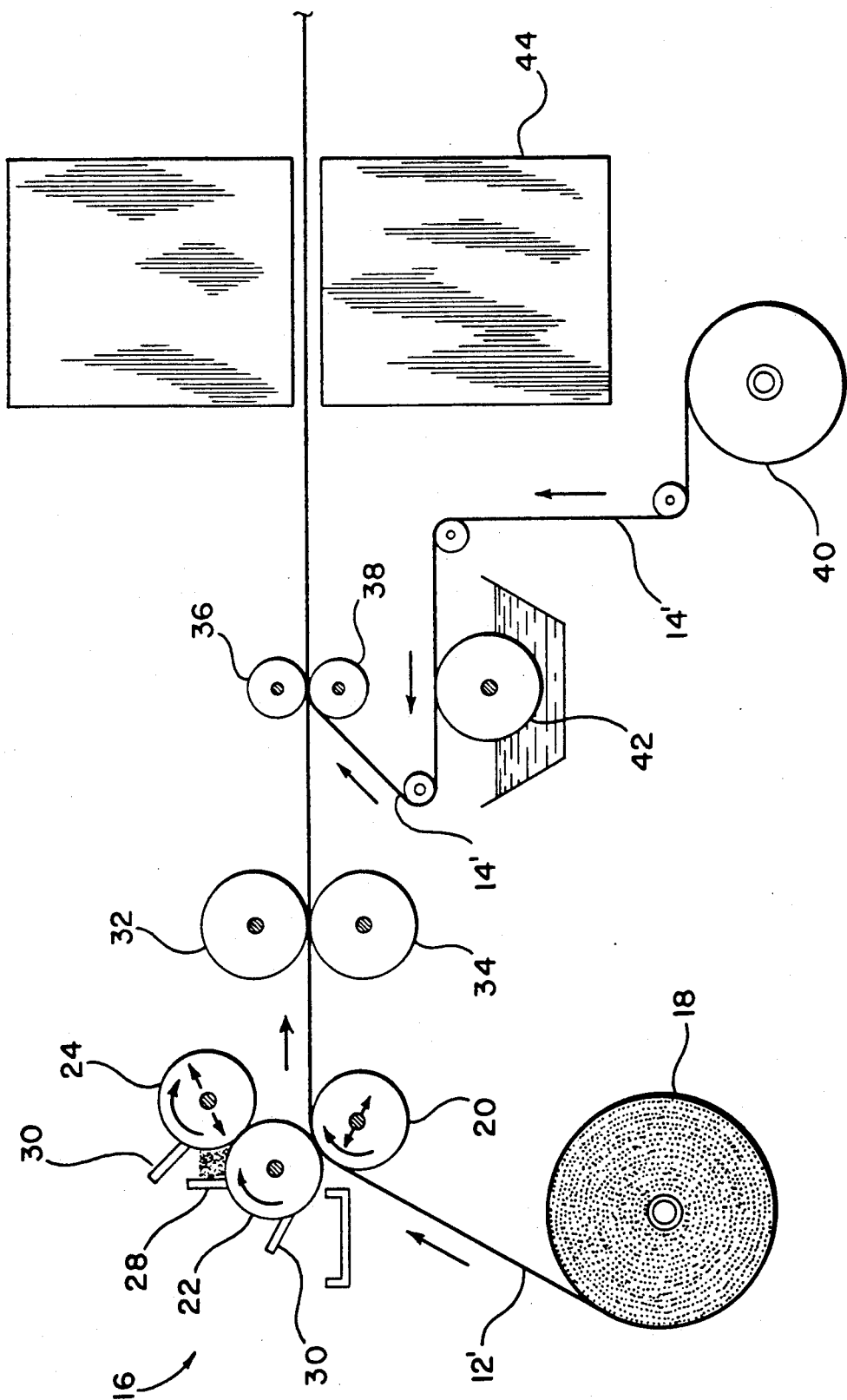
FIG. 2 is a side elevational view of an apparatus designed to produce a carpet cushion structure in accordance with the present invention.

Referring now to FIG. 2, a substantially diagrammatic side elevation view is depicted of an apparatus 16 used to produce the composite carpet padding structure of the present invention. The polymer latex is preferably applied in the present invention using a reverse roll applicator. The open-celled polyurethane foam base material 12' is fed from a roll 18 over rubber backing roll 20. Transfer roll 22 and metering roll 24 coact to load transfer roll 22 with a predetermined amount of the polymer latex 26 from coating dam 28, the polymer latex being applied to the polyurethane foam 12' as the foam passes through a nip between transfer roll 22 and rubber backing roll 20. Both transfer roll 22 and metering roll 24 are provided with doctor blades 30 which act to prevent excessive buildup of the polymer latex. It is to be noted with respect to FIG. 2 that the arrows are included to indicate direction of travel of the sheets and rollers.

After the polymer latex has been applied to the polyurethane foam material, the sheet 12' is passed between a pair of squeeze rolls 32, 34 which compress the foam and force the latex to fully penetrate and impregnate the entire thickness of the foam sheet 12'. The foam sheet is then passed, prior to the drying stage, between a pair of laminating rolls 36, 38 at which point a laminate substrate 14' is contacted with the foam sheet on one surface thereof.

The laminate substrate 14' is itself fed from a roll 40, preferably across an adhesive applicator roll 42, and brought into contact with a lower surface of impregnated foam sheet 12' at laminating rolls 36, 38. The foam sheet and substrate are pressed together between rolls 36 and 38, and the polymer latex, which has not yet dried, is pressed between the fibers of the substrate and the latex substantially coats the fibers as well. The composite carpet cushion structure is then passed through a heater 44 to evaporate the water from the latex in forming the final product.

It should be noted that, although the process is described as including the application of adhesive to the substrate prior to contacting the foam sheet material, the latex itself may provide sufficient bonding between the foam and the substrate for certain substrates and for certain anticipated uses. In these instances, the application of the adhesive to the substrate may be omitted.

Figure 3:
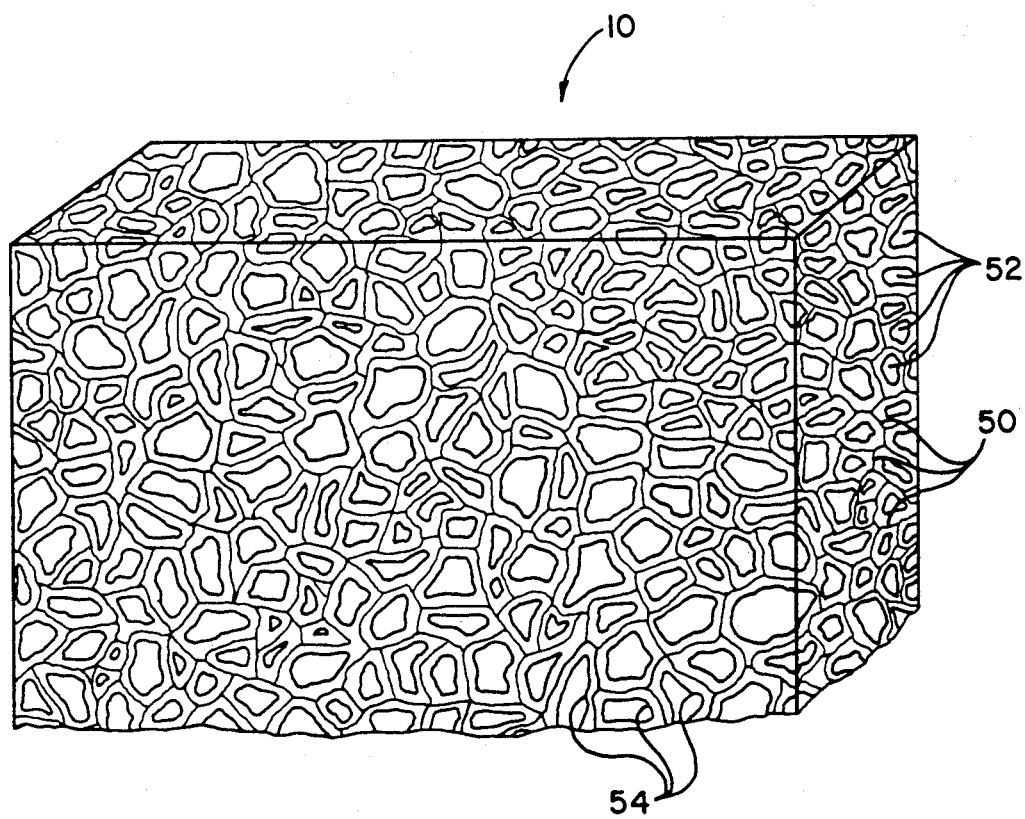
FIG. 3 is a cross-sectional view of a carpet cushion structure of the invention.

The impregnated foam portion of the end product 10 is shown in cross-section in FIG. 3. There it can be seen that the interior walls 50 of the open cells 52 of the foam are coated with the impregnant composition 54 according to the present invention. It will be understood by those skilled in the art that the composition of the fluid polymer may be adjusted to control the density of the final composite structure.

The composite carpet cushion product preferably should employ a foam material 12 having a thickness in the range of approximately 80 to 650 mils. When such a foam is impregnated with the cold styrene-butadiene polymer, natural rubber, or combination of the two, a carpet padding having highly desirable properties, such as resiliency over an extended period of time, is produced.

This preferred embodiment of the present invention is illustrated by the following non-limiting examples.

EXAMPLE 1

A flexible, light-weight (less than 1 lb./cubic ft. density) open-celled urethane foam layer having a thickness of about 0.5 in. is saturated with a previously prepared latex composition containing 22.5%, by weight, of cold styrene-butadiene rubber. Calcium carbonate, silicates, barytes, aluminum trihydrates, etc., or a combination of fillers, at levels of 1-1000 parts based on 100 parts of dry polymers in the system, curing system (as shown), antioxidant (alkylated phenol), and soap (potassium oleate) are also added. The latex composition containing 80% solids is applied to the flexible urethane foam using the reverse roll applicator and squeeze rolls shown by FIG. 2 to uniformly dispense (saturate) the latex throughout the flexible urethane foam. The saturated foam is carried on an endless open mesh belt into a curing oven having vertical air flow and a temperature from 120° F. to 550° F. to dry and cure the saturated urethane foam. The resultant flexible uniform cell structure foam exhibits all the qualities of the latex polymer compound product which was used to saturate the urethane foam.

The use of the light-weight urethane flexible foam only as a carrier and cell structure controller allows a cellular product to be made from most aqueous polymers of fluid compounds which heretofore could not easily be formed into foamed structures. The density of the product may be varied between about 1.5 and 40 lbs. per cubic foot. Thicknesses 0.0675 inch to 4.00 inches may also be obtained. In particular, when cold or non-carboxylated styrene-butadiene rubber, natural rubber, or a combination of these two is employed in impregnating a foam layer between 80 and 650 mils in thickness, the cushion structure produced will have desirable physical properties for carpet underlay service, namely improved compression set, improved compression resistance, and improved resistance to tearing.

FIG. 1 depicts the foamed structure 10 produced by Example 1.

EXAMPLE 2

The prodecure of Example 1 was followed utilizing the materials and process parameters set forth below.

|  | Dry | Wet |
|---|---|---|
| 70% Cold SBR Latex | 100.00 | 142.86 |
| Water | To adjust composition to 80% total solids | |
| 20% Potassium Oleate | 3.00 | 15.00 |
| Calcium Carbonate | 250.00 | 250.00 |
| Use polyacrylate thickener to adjust viscosity to 1500-3000 CPS. | | |
| Add cure system prior to use. | | |
| CURE SYSTEM | | |
| 50% Antioxident (Alkylated Phenols) | 1.50 | 3.00 |
| 60% Zinc Oxide Dispersion | 2.00 | 2.83 |
| 60% Sulfur Dispersion | 1.70 | 2.83 |
| 50% Zinc Diethyl Thiocarbamate Dispersion | 1.00 | 2.00 |
| 50% ZMBT Dispersion (Zinc Mercapto Benzyl Thiozole) | 1.80 | 3.60 |

EXAMPLE 3

Two carpet padding samples of different density were produced in accordance with Examples 1 and 2 of the present invention, and were tested to measure properties of particular importance for products used in carpets underlay service.

| Sample CPS-20 | |
|---|---|
| Weight | 49.1 ounces per sq. yd. |
| Density | 16.1 lbs. per cu. ft. |
| Thickness | 0.255 in. |
| Aging (Heat) (24 hrs./275° F.) | Pass |
| Compression Set (22 hrs./158° F.) | |
| 30 min. recovery/70° F. | 23.7% |
| 6 hr. recovery/70° F. | 13.2% |

-continued

| | |
|---|---|
| Compression Resistance (25% deflection) | 5 lbs. per sq. in. |
| Tensile Strength | |
| Length | 86.8 lbs. force |
| Width | 94.4 lbs. force |
| Percent Elongation | |
| Length | 20.7% |
| Width | 31.3% |
| Sample CPS-35 | |
| Weight | 81.1 ounces per sq. yd. |
| Density | 29.6 lbs. per cu. ft. |
| Thickness | 0.228 in. |
| Aging (Heat) (24 hrs./275° F.) | Pass |
| Compression Set (22 hrs./158° F.) | |
| 30 min. recovery/70° F. | 25% |
| 6 hr. recovery/70° F. | 19.5% |
| Compression Resistance (25% deflection) | 20 lbs. per sq. in. |

Figure 4:
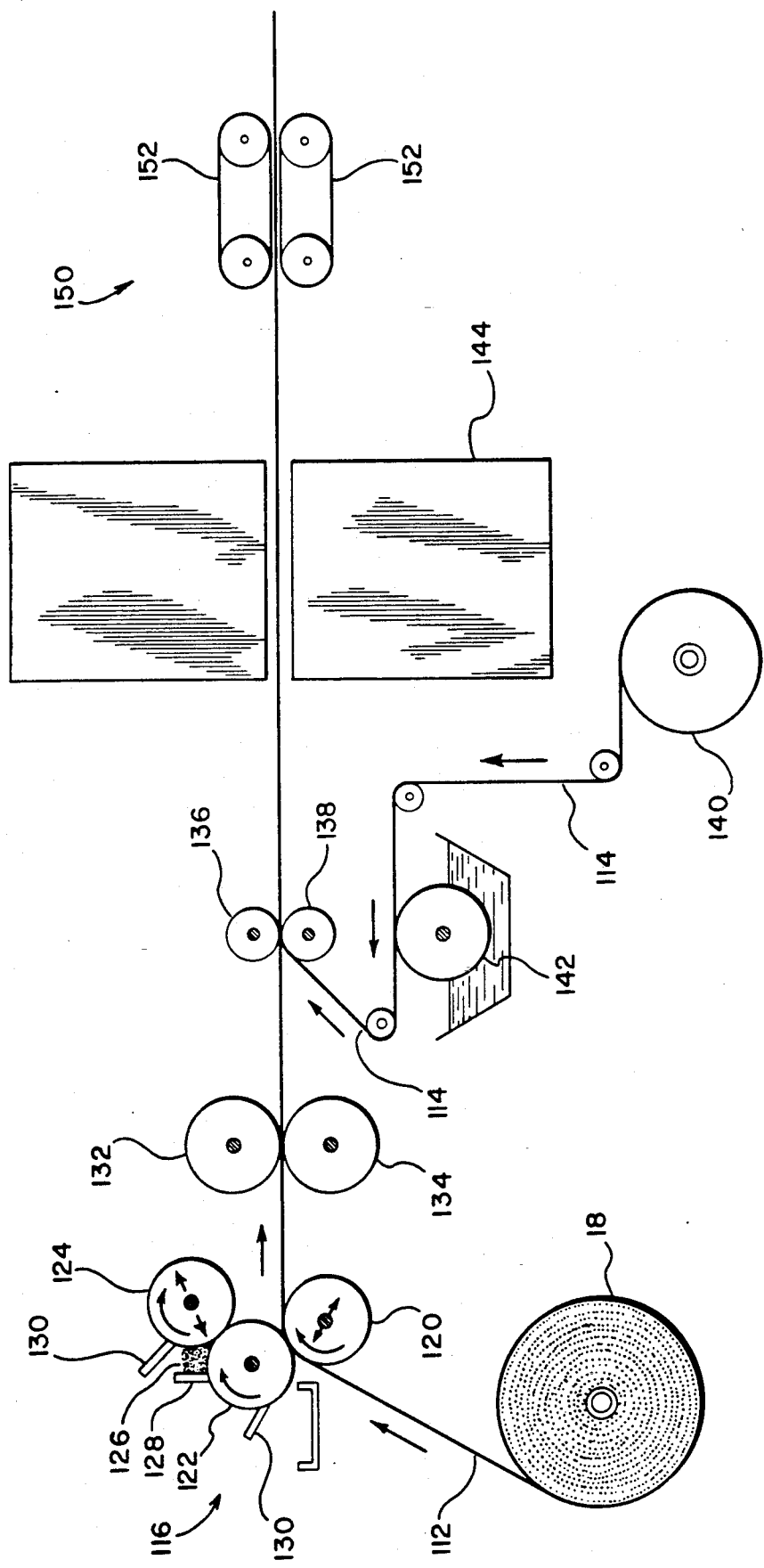
FIG. 4 is a side elevational view of an apparatus designed to produce a cushion structure in accordance with an alternate method of the present invention.
Figure 5:
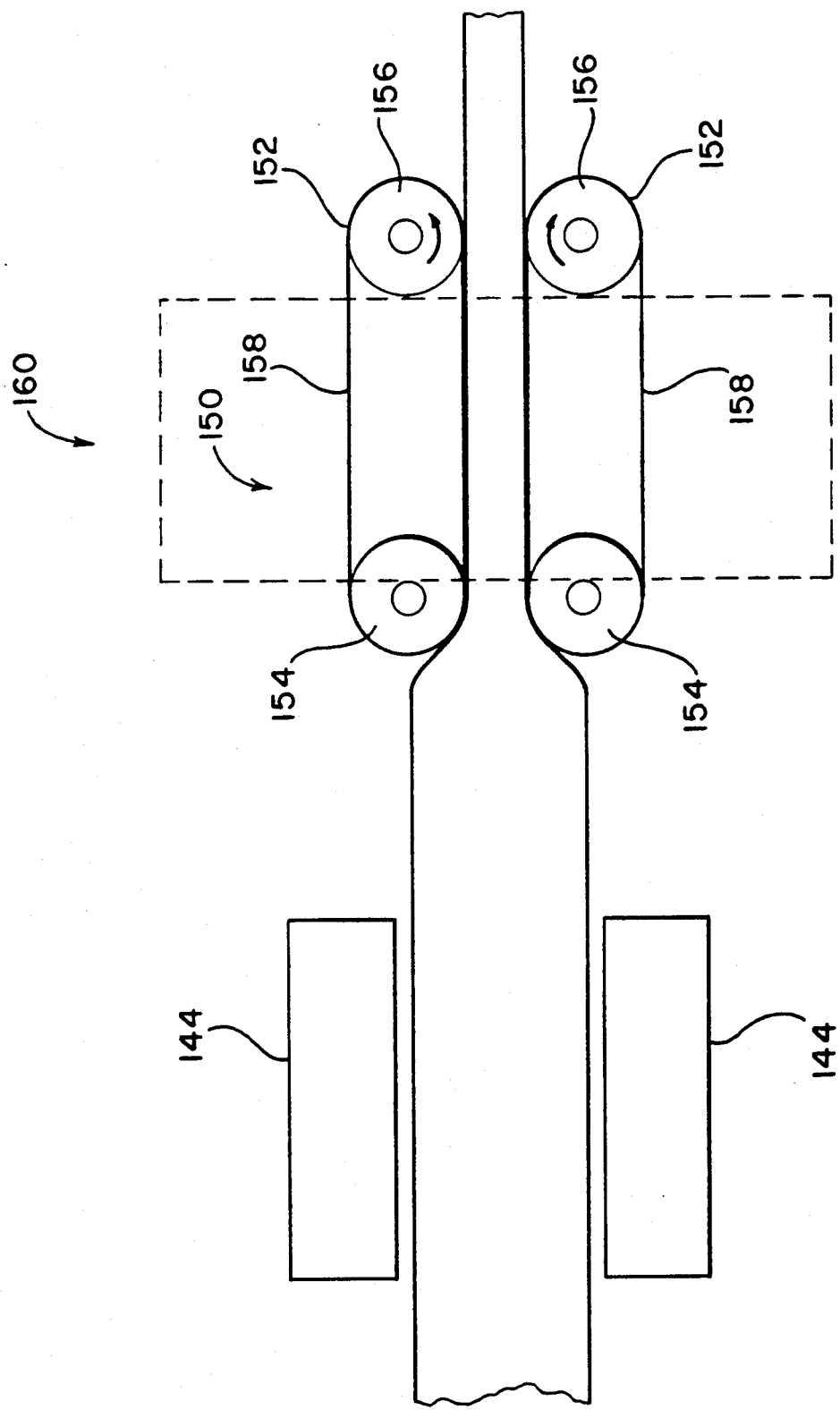
FIG. 5 is a side elevational view, shown substantially in schematic form, of the heating and compressing means employed in accordance with the alternate method of the present invention.

FIGS. 4 and 5 are directed to an alternative padding or cushion material and a method for making the padding or cushion material in accordance with the present invention. This padding material employs an open-cell foam carrier, preferably a polyurethane foam carrier 112 as in the previous embodiment, however, the impregnant in this embodiment may be aqueous (latex) or non-aqueous, and may employ a thermosetting resin or thermoplastic polymer composition.

FIG. 4 is a substantially diagrammatic representation of an apparatus 116 which is, for the most part, identical to that of FIG. 2. The desired impregnant 126 is preferably applied using a reverse-roll applicator, particularly when the selected impregnant is a polymer latex. Various other methods of applying the impregnant to the foam carrier may be employed with substantially equal effectiveness. The open-celled polyurethane foam base material 112 is fed from a roll 118 over rubber backing roll 120. Transfer roll 122 and metering roll 124 coact to load transfer roll 122 with a predetermined amount of the impregnant 126 from coating dam 128, the impregnant being applied to the polyurethane foam 112 as the foam passes through a nip between transfer roll 122 and rubber backing roll 120. Both transfer roll 122 and metering roll 124 are provided with doctor blades 130, which act to prevent excessive buildup of the impregnant 126 on the rolls. The arrows included in FIG. 4 are provided to show the direction of travel of the sheets and rollers.

After the impregnant 126 has been applied to the polyurethane foam material, the sheet 112 may be passed between a pair of squeeze rolls 132, 134 which temporarily compress the foam and force the impregnant to fully penetrate and impregnate the entire thickness of foam sheet 112. The foam sheet may then be passed between a pair of laminating rolls 136, 138, at which point a laminate substrate 114 is contacted with the foam sheet on one surface thereof.

The laminate substrate 114 is itself fed from a roll 140, preferably across an adhesive applicator roll 142, and brought into contact with a lower surface of impregnated foam sheet 112 at laminating rolls 136, 138. The foam sheet and substrate are pressed together between rolls 136 and 138, and the impregnant 126, which has preferably not completely dried or cured, is pressed between the fibers of the substrate, thereby coating the fibers as well.

It should be noted that, although the process is described as including the application of adhesive to the substrate prior to contacting the foam sheet material, the impregnant itself may provide sufficient bonding between the foam and the substrate for certain substrates and for certain anticipated uses. In these instances, the application of the adhesive to the substrate may be omitted.

It should also be noted that the padding structure may be produced having a substrate adhered to both the upper and lower surfaces, as will be evident to those skilled in the art upon reading the present specification. Further, the padding material may be produced without having any substrate adhered thereto, in which case the portions of the apparatus employed in applying the substrate may be either idled or omitted from the apparatus entirely.

In accordance with the alternative embodiment of the present invention, the impregnated foam sheet material is crushed or compressed during at least a final portion of the drying or curing of the impregnant 126, such that the resulting composite open-cell foam product is of a reduced thickness as compared with the original thickness of the foam carrier 112. In the preferred embodiment of the present invention, this is accomplished by first passing the impregnated foam carrier through a heater 144, and subsequently passing the foam carrier through thickness reduction means 150, depicted in FIGS. 4 and 5 as a pair of endless belt assemblies 152 disposed on opposite sides of the foam carrier 112 and spaced apart at a predetermined distance substantially equal to the desired thickness of the final padding material to be produced. It is possible to use alternate means for compressing the impregnated foam, for example, using one or more pairs of squeeze knips similar to laminate rolls 136, 138.

In the somewhat more detailed view of FIG. 5, it can be see that each endless belt assembly 152 comprises at least a first and a second roll 154, 156, having an endless belt 158 extending around the rolls. At least one of the rolls of each belt assembly will preferably be powered or driven, for example by a drive motor, in a manner well known in the art. The facing surfaces of the belts 158 are spaced apart at a predetermined desired distance, which distance is preferably adjustable by using suitable adjustment means disposed on the apparatus, the spacing distance between the belts being substantially equal to the desired end thickness of the padding material produced in accordance with this embodiment of the invention.

After the foam carrier 112 has been saturated or impregnated with the impregnant 126, the foam carrier is heated, as for example, by heater 144, which may be an air-circulating oven. The temperature to which the foam carrier/impregnant will be heated will vary depending upon the type of polymer employed in the impregnant. Generally, in the case of thermoplastic polymers, the foam carrier/impregnant will be heated to or slightly above the thermoplastic temperature of the particular thermoplastic polymer employed. In the case of thermosetting resins, the foam carrier/impregnant will be heated to a temperature just under the thermosetting temperature of the particular thermosetting polymer employed. Again, a heater 144, such as an air-circultting oven would be suitable for this purpose.

Upon heating to the appropriate temperature as set forth above, the foam carrier/impregnant is introduced into the thickness reduction means 150, to crush or compress the foam carrier to a desired final thickness. In the situation where a thermoplastic impregnant is used, the temperature of the foam carrier and impregnant is preferably maintained until drying or curing is completed, and the temperature is then reduced to a temperature below the thermoplastic temperature while the foam carrier is maintained in the state of reduced thickness. After the impregnant is cooled below the thermoplastic temperature, the thermoplastic polymer will no longer be in a softened, moldable state and the influence of thickness reduction means on the foam carrier may then be removed, either by removing the thickness reduction means or by permitting the foam carrier to exit from the thickness reduction means, as seen, for example, in FIG. 5. The dried or cured impregnant serves to freeze the finished product at substantially the thickness to which the foam carrier/impregnant was reduced in the thickness reduction means.

It should be recognized that when a thermoplastic material is employed as the impregnant/saturant, the crushing to the desired finished thickness may be done either at the time of the initial impregnation, as in the FIG. 4 apparatus configuration, or may be done at some later time by reheating the composite structure to a temperature above the thermoplastic temperature, which softens the thermoplastic polymer and permits the composite structure to be deformed plastically in the sense that once the foam carrier/impregnant is again subsequently cooled below the thermoplastic temperature, the product will be "frozen" into a configuration having the reduced thickness.

In the situation where a thermosetting material is employed as the impregnant, the foam carrier/impregnant is introduced into the thickness reduction means 150 at a temperature lower than, and preferably just below, the thermosetting temperature. While the foam carrier/impregnant is maintained at a reduced thickness, the temperature of the foam carrier is raised to and held at the thermosetting temperature until thermosetting takes place in the impregnant. As shown in broken lines in FIG. 5, a separate heater 160 disposed at the location of the thickness reduction means may be used to boost the temperature of the foam carrier/impregnant to a temperature at which thermosetting will occur. Alternatively, a single heating means could be used to replace both heater 144 and heater 160, and the thickness reduction means could be at least partially disposed inside the single heating means beginning at a point where the temperature of the foam carrier/impregnant is just below the thermoset temperature. As the crushed foam carrier 112 progresses through the heater, the temperature will be raised to a temperature above the thermosetting temperature to induce thermoset in the impregnant.

Once thermosetting of the impregnant has taken place, the impregnant will hold the foam carrier in its crushed (reduced thickness) configuration. The influence of the thickness reduction means may then be removed, and no further flowing of the impregnant will take place. A finished product will thus be produced having substantially the same thickness as that to which the foam carrier has been reduced in the thickness reduction means.

The thermoplastic or thermosetting temperatures of the various impregnants which may be used in the method of the present invention will be, for the most part, well known to those of ordinary skill in the art. However, even if the relevant (i.e., thermoplastic or thermosetting) temperature of an impregnant desired to be used is not known at the outset, the temperature may be determined in a relatively straightforward manner by known methods.

As noted earlier, the impregnant 126 to be used in producing an open-cell foam structure according to this alternative preferred embodiment may be either aqueous (water based, latex) or non-aqueous, and may contain either a thermosetting resin or polymer, or a thermoplastic polymer. Examples of preferred impregnants, which examples are to be non-limiting in nature, are: synthetic rubbers such as styrene-butadiene copolymers, acrylonitrile-butadiene-styrene terpolymers, and other synthetic rubbers, acrylic and methacrylic polymer and polymers, polyvinyl chloride, PVAC, vinyl acetate, and polypropylene.

The foam structure which is the end product of the alternate method preferably remains open-celled, in that the foam carrier is preferably not crushed or compressed to the extent that the impregnant completely fills all of the voids in the open cells of the foam carrier as the finished product loses a great deal if not all of its resiliency at that point. Instead, compression or crushing of the foam carrier will preferably produce an end product having a thicker "coating" of the impregnant on the cell walls of the foam carrier as compared to the coating present on the open cell foam structure of the first disclosed embodiment, which is cured or dried in an uncompressed state. The range of crushing or compressing of the foam carrier into an end product, set forth as a percentage of the original foam carrier thickness, may be from about 10% to 90%, and a preferred range will be from about 25% to 75%. The original thickness of the polyurethane foam carrier 112 may be any desired thickness up to about four inches, and even thicker assuming substantially complete impregnation through the thickness of the material can be achieved.

Another parameter meriting consideration in practicing the method for producing a compressed open-cell foam structure having the mechanical and physical properties of the impregnant, as opposed to the polyurethane foam carrier, is the weight ratio of the material "added on" to the foam carrier with respect to the total weight of the end product. In this preferred embodiment, the add-on material preferably constitutes from about 15% to about 99% of the total weight.

The composite open-cell structure produced by this alternate preferred method may advantageously be used as a padding material, with the amount of resiliency being controlled to some extent by the percentage reduction in thickness of the structure from the original thickness of the foam carrier. Properties such as resiliency and the properties identified in the examples presented directed to the first embodiment may be varied without changing the composition of the impregnant by instead changing the amount by which the thickness of the structure is reduced. The composite open-cell foam structure will have various uses, such as carpet padding or underlay, or as padding or cushioning used in bedding products, shoe foam, and other cushioning products.

The composite structure, when used as a carpet underlay, may advantageously be used as a padded backing for "carpet tiles", which are square (or any other shape) sections of carpet product now enjoying widespread use in commercial applications, especially in high-rise buildings. The installation of these carpet section is done in a manner similar to ceramic or linoleum tiles in that the sections are laid next to one another to collectively form a floor covering having a particular pattern.

While the composite open cell foam structure of the present invention has been described above with respect to preferred embodiments, it will be recognized by those skilled in the art that variations and modifications may be made without departing from the spirit and scope of the present invention. The scope of protection is therefore to be determined by reference to the appended claims.

What is claimed is:

1. A carpet underlay cushion structure comprising: a carrier layer of open-cell resilient foam material having an initial thickness, said resilient foam material being substantially completely and uniformly impregnated with an impregnant composition containing a polymer which is cured after said impregnation, wherein the open cells of said carpet underlay cushion structure partially comprise said foam material of said carrier layer, and wherein said cured polymer impregnant retains said carpet underlay cushion structure comprising said carrier layer and said cured polymer impregnant at a finished thickness less than said initial thickness of said carrier layer, and wherein the carpet underlay cushion structure possesses substantially the mechanical and physical properties of the polymer impregnant and wherein said carpet underlay cushion structure retains an open cell configuration at said finished thickness.

2. A composite open-cell foam structure as recited in claim 1, wherein said polymer-containing composition comprises a thermosetting resin.

3. A composite open-cell foam structure as recited in claim 1 wherein said polymer-containing composition comprises a thermoplastic polymer.

4. A composite open-cell foam structure as recited in claim 1 wherein said polymer-containing composition is an aqueous solution prior to curing.

5. A composite open-cell foam structure as defined in claim 1 wherein said polymer-containing composition is non-aqueous prior to curing.

6. A composite open-cell foam structure as recited in claim 2 wherein said polymer-containing composition is an aqueous solution prior to curing.

7. A composite open-cell foam structure as defined in claim 2 herein said polymer-containing composition is non-aqueous prior to curing.

8. A composite open-cell foam structure as recited in claim 3 wherein said polymer-containing composition is an aqueous solution prior to curing.

9. A composite open-cell foam structure as defined in claim 3 wherein said polymer-containing composition is non-aqueous prior to curing.

10. A composite open-cell foam structure as recited in claim 1, wherein said carrier layer of open-cell resilient foam material is a polyurethane.

11. A composite open-cell foam structure as recited in claim 1 wherein said thickness of said structure is from about 10% to 90% of said initial thickness of said carrier layer.

12. A composite open-cell foam structure as recited in claim 10 wherein said thickness of said structure is from about 10% to 90% of said initial thickness of said carrier layer.

13. A composite open-cell foam structure as defined in claim 1, wherein said polymer-containing composition comprises polyvinyl chloride.

14. A composite open-cell foam structure as defined in claim 1, wherein said polymer-containing composition comprises PVAC.

15. A composite open-cell foam structure as defined in claim 1, wherein said polymer-containing composition comprises polypropylene.

16. A composite open-cell foam structure as defined in claim 1, wherein said polymer-containing composition comprises vinyl acetate.

17. A method for making a carpet underlay cushion structure, especially adapted for use as a padding material, comprising:
substantially uniformly impregnating a carrier layer of open-cell, resilient foam material with an impregnant comprising a fluid composition containing a polymer, said carrier layer having an initial thickness, thereby forming a composite open-cell foam structure.
then compressing said open-cell composite foam structure comprising said carrier layer impregnated with said fluid composition to a desired thickness while said impregnant is in a state permitting said composite open-cell foam structure to be plastically deformed, and
subsequently releasing from compression said composite open-cell foam structure when said impregnant is in a substantially non-plastically deformable state.

18. A method for making a composite open-cell foam structure as defined in claim 17, wherein said polymer-containing fluid composition comprises a thermosetting resin, and wherein said step of compressing said open-cell composite foam structure is performed at a temperature below a thermosetting temperature of said thermosetting resin, and wherein said subsequent releasing step is performed after said composite open-cell foam structure is heated to a temperature above said thermosetting temperature and held for a time sufficient to allow said resin to be thermoset.

19. A method for making a composite open-cell foam structure as defined in claim 17, wherein said polymer-containing fluid composition comprises a thermoplastic material, and wherein said step of compressing said open-cell composite foam structure is performed when a temperature of said open-cell composite foam structure is above a thermoplastic temperature of said thermoplastic polymer, and wherein said subsequent releasing step is performed when said open-cell composite structure is below said thermoplastic temperature.

20. A method for making a carpet underlay cushion structure comprising:
substantially uniformly impregnating a carrier layer of open-cell resilient foam material with an impregnant comprising a fluid composition containing a thermosetting resin, said carrier layer having an initial thickness, thereby forming a composite open-cell foam structure;
then compressing said composite open-cell foam structure comprising said carrier layer impregnated with said fluid composition to a desired thickness,
heating said composite open-cell foam structure to a temperature above a thermosetting temperature of said thermosetting resin while said composite open-cell foam structure is maintained in compression at said desired thickness;

holding said composite open-cell foam structure in compression at said temperature above said thermosetting temperature for a time sufficient to permit said resin to thermoset; and subsequently releasing from compression said composite open-cell foam structure.

21. A method for making a carpet underlay cushion structure comprising:

substantially uniformly impregnating a carrier layer of open-cell resilient foam material with an impregnant comprising a fluid composition containing a thermoplastic material, said carrier layer having an initial thickness, thereby forming a composite open-cell foam structure;

heating said composite open-cell foam structure comprising said carrier layer impregnated with said fluid composition to a temperature above a thermoplastic temperature of said thermoplastic material;

then compressing said composite open-cell foam structure to a desired thickness while said structure is at said temperature above said thermoplastic temperature;

cooling said composite open-cell foam structure to a temperature below said thermoplastic temperature; and subsequently releasing from compression said composite open-cell foam structure.

22. A carpet underlay cushion structure as recited in claim 1, wherein said structure is bonded to a back of a section of carpet.

* * * * *